(12) United States Patent
Picot et al.

(10) Patent No.: US 12,303,920 B2
(45) Date of Patent: May 20, 2025

(54) FLUID SPRAY NOZZLE FOR CLEANING DEVICE FOR AN OPTICAL DETECTION SYSTEM

(71) Applicant: Valeo Systèmes d'Essuyage, Le Mesnil Saint Denis (FR)

(72) Inventors: Philippe Picot, Issoire (FR); Maxime Baudouin, Issoire (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 336 days.

(21) Appl. No.: 17/418,098

(22) PCT Filed: Dec. 17, 2019

(86) PCT No.: PCT/EP2019/085527
§ 371 (c)(1),
(2) Date: Jun. 24, 2021

(87) PCT Pub. No.: WO2020/136036
PCT Pub. Date: Jul. 2, 2020

(65) Prior Publication Data
US 2022/0055045 A1 Feb. 24, 2022

(30) Foreign Application Priority Data
Dec. 26, 2018 (FR) ........................................ 1874191

(51) Int. Cl.
*B05B 1/26* (2006.01)
*B05B 1/04* (2006.01)
*B60S 1/56* (2006.01)

(52) U.S. Cl.
CPC ................ *B05B 1/267* (2013.01); *B05B 1/04* (2013.01); *B60S 1/56* (2013.01)

(58) Field of Classification Search
CPC .............. B05B 1/267; B05B 1/04; B60S 1/56
(Continued)

(56) References Cited

U.S. PATENT DOCUMENTS

2005/0121539 A1* 6/2005 Takada .................... B60S 1/528
239/284.2
2008/0142619 A1 6/2008 Kim
(Continued)

FOREIGN PATENT DOCUMENTS

DE 102007011624 A1 6/2008
DE 102007037492 A1 2/2009
(Continued)

OTHER PUBLICATIONS

International Search Report and Written Opinion issued in corresponding International Patent Application No. PCT/EP2019/085527, mailed on Mar. 12, 2020 (10 pages).
(Continued)

*Primary Examiner* — Chee-Chong Lee
(74) *Attorney, Agent, or Firm* — Osha Bergman Watanabe & Burton LLP (57) ABSTRACT

A nozzle for spraying a fluid for arrangement on a body of a cleaning device of an optical detection system mounted on a motor vehicle is disclosed. The nozzle has an internal distribution duct which extends between a proximal end, for being fluidly connected to a fluid distribution channel arranged in the body, and a distal end forming a fluid outlet orifice, the distribution duct being defined at least by a back wall and two opposite lateral walls, the nozzle further comprising a ramp arranged on the path of the fluid at the outlet orifice. The lateral walls are arranged at the distal end of the distribution duct so as to be distanced from one another, the distribution duct flaring in the direction of the ramp.

10 Claims, 5 Drawing Sheets

(58) Field of Classification Search
USPC ........................................................ 239/284.1
See application file for complete search history.

(56) References Cited

U.S. PATENT DOCUMENTS

| | | |
|---|---|---|
| 2009/0014555 A1 | 1/2009 | Litvinov et al. |
| 2013/0240569 A1* | 9/2013 | Hamza ................ B05B 11/1001 |
| | | 222/251 |
| 2015/0040953 A1* | 2/2015 | Kikuta ...................... B60S 1/56 |
| | | 134/123 |
| 2015/0166021 A1 | 6/2015 | Gokan et al. |
| 2016/0272163 A1* | 9/2016 | Dreiocker ............. H04N 23/811 |
| 2016/0339875 A1* | 11/2016 | Ina ........................... B60S 1/522 |
| 2018/0021792 A1* | 1/2018 | López ..................... B08B 3/02 |
| | | 239/456 |
| 2018/0029566 A1 | 2/2018 | Gopalan et al. |
| 2018/0201232 A1* | 7/2018 | Ringler .................... B08B 3/02 |
| 2020/0238955 A1 | 7/2020 | Walsøe et al. |

FOREIGN PATENT DOCUMENTS

| | | |
|---|---|---|
| DE | 102017223393 A1 | 10/2018 |
| EP | 3141441 A1 | 3/2017 |
| FR | 3056515 A1 | 3/2018 |
| FR | 3056526 A1 | 3/2018 |
| JP | 2016-078688 A | 5/2016 |
| WO | 2018-059806 A1 | 4/2018 |
| WO | 2018059770 A1 | 4/2018 |

OTHER PUBLICATIONS

Notice of Reasons for Refusal in corresponding Japanese Application No. 2021-537791, dated Sep. 2, 2022 (10 pages).

Office Action Issued in Corresponding CN application No. 201980085912.4, dated Mar. 31, 2023. (24 pages with English Translation).

* cited by examiner

FLUID SPRAY NOZZLE FOR CLEANING DEVICE FOR AN OPTICAL DETECTION SYSTEM

The present invention relates to the field of driving aid devices and, more particularly, to the field of the optical detection systems used for this purpose. The invention relates more particularly to the cleaning devices which are configured to clean an optical sensor of such an optical detection system.

Optical detection system is the name given to any system including optical sensors, such as cameras, laser sensors or other sensors based on the emission and/or the detection of light in the spectrum visible or invisible to humans, in particular the infrared.

Such optical detection systems are being fitted to an increasingly large number of motor vehicles in order either to assist the driver of the vehicle in certain driving situations, of which one that is well known is parking assistance, or to make the vehicle self-driving or at least partially self-driving. In order for the self-driving feature and/or the driver assistance to be as effective as possible, the data supplied by the optical detection system have to be of the best possible quality, and it is therefore essential to have clean optical systems to perform these data acquisitions. In order to achieve this, a cleaning device is arranged in the vicinity of an optical detection device (for example the lens of an image-capturing camera) so that a fluid can be sprayed, on demand, in order to remove any dirt that has become deposited on the surface of the detection device.

In the known way, such a cleaning device comprises a body for conveying cleaning fluid through which body the cleaning fluid is able to circulate, from a fluid storage reservoir toward one or more spray nozzles arranged at the end of the conveying body at the outlet of a fluid distribution duct. The fluid is ejected from the device via these spray nozzles, toward the optical sensor that is to be cleaned.

In order to optimize the cleaning, a notable objective is to spray the fluid in the form of a flat or substantially flat jet, in which the fluid is concentrated on a spray line, rather than as a jet referred to as a conical jet in which the fluid is sprayed in a diffuse fashion. In order to achieve that, it is known practice to employ a spray nozzle with a ramp positioned in front of the outlet of the distribution duct, so as to deflect the flow of the fluid sharply towards the optical sensor that is to be cleaned. This sudden-deflection phenomenon causes the shape of the fluid to be changed into a divergent flat jet.

Now, it would appear that the angle of divergence of the flat jet varies notably according to the pressure and the viscosity of the fluid. Over a determined period, the inventors have thus been able to observe a variation of the order of 20° in the value of the divergence angle of a flat jet emitted by this type of spray nozzle. As a result, the quality of the cleaning varies according to the temperature and the degree of wear of the fluid-compression means of the cleaning device, the value of the divergence angle increasing as the fluid pressure increases.

The invention seeks to propose a nozzle for spraying of a fluid for cleaning the surface of an optical sensor, that sprays a fluid in the form of a flat jet, at a divergence angle that remains more stable over the course of time in comparison with the prior art.

According to the invention, the spray nozzle, able to be arranged on a body of a cleaning device for cleaning an optical detection system mounted on a motor vehicle, comprises an internal distribution duct which extends between a proximal end, able to be fluidically connected to a fluid distribution canal formed in said body, and a distal end forming an outlet orifice for the fluid, the distribution duct being delimited at least by a bottom wall and two opposing lateral walls, said nozzle furthermore comprising a ramp arranged in the path of the fluid at the level of the outlet orifice. The lateral walls are arranged at the level of the distal end of the distribution duct so as to diverge from one another, said distribution duct flaring in the direction of the ramp.

In other words, the cross section for the passage of the fluid in the distribution duct is increased in the vicinity of the ramp, so as to cause the fluid to spread out before it encounters the ramp. That provides control over the maximum spread of the fluid before its contact with the ramp breaks up the flow to generate a flat jet.

According to another feature of the invention, the bottom wall and the lateral walls respectively comprise an arris at their intersection with the ramp. In other words, three of the walls that contribute to delimiting the distribution duct, namely the bottom wall and the lateral walls, all extend longitudinally until they come into contact with the inclined plane that forms the ramp. This then ensures that the maximum angle of spread of the fluid, as calibrated by the flaring of the lateral walls, is maintained at the moment of contact of the fluid with the ramp. Control over the angle of opening of the flat jet after the fluid has been deflected by the ramp is thus improved.

According to other features of the invention, taken alone or in combination, it will be possible to make provision that:
- the lateral walls extend perpendicular to the bottom wall at least at the level of the distal end of the distribution duct in the portion in which they diverge from one another;
- the intersection between each lateral wall and the ramp forms a rectilinear or near-rectilinear arris of intersection, said arrises of intersection making between them an angle of opening comprised between 10° and 80°; the angle of opening may preferably be of the order of 40°;
- the ramp forms with the plane in which the bottom wall of the distribution duct extends, an angle of inclination of which the value is comprised between 10° and 60°;
- the spray nozzle comprises a base and a cover part which are fixed one on the other to form the distribution duct between them;
- the cover part is configured to form, in one piece, the bottom wall of the distribution duct, the lateral walls and the inclined plane that forms the ramp;
- the bottom wall of the distribution duct is parallel or substantially parallel to a wall delimiting the distribution duct on the opposite side and formed by an end face of the base;
- the inclined plane that forms the ramp extends as a projection from the cover part, in the direction of the base, so as to offer a height greater than that of the lateral walls; what is meant by height is the dimension in a direction perpendicular to the cover-part plane from which the ramp extends;
- the base and the cover part are adhesively bonded or fusion bonded to one another.

The invention also relates to a cleaning device for an optical detection system mounted on a motor vehicle, comprising a spray nozzle as defined hereinabove.

The spray nozzle may be arranged at the end of a telescopic body, the cleaning device being configured to adopt at least a rest position and a work position in which the spray nozzle faces a glazed surface of the optical detection system that is to be cleaned.

The invention also relates to a motor vehicle comprising a device for cleaning an external face of an optical sensor described hereinabove.

Other features, details and advantages of the invention and its operation will become more clearly apparent from reading the description given hereinafter by way of illustration and with reference to the appended figures, in which.

It should first of all be noted that although the figures set out the invention in detail for its implementation, they may, of course, be used to better define the invention if necessary. It will also be understood that the embodiment of the invention illustrated in the figures is given as a non-limitative example.

Figure 1:
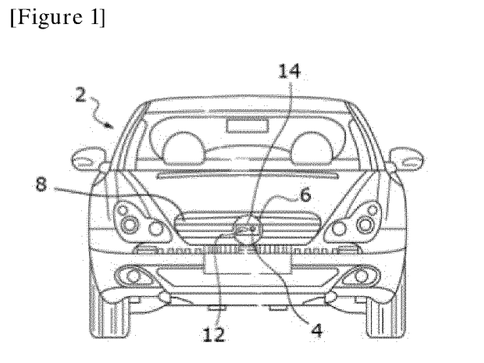
FIG. 1 is a face-on view of a motor vehicle, of which the front face is equipped with an optical detection system and with a cleaning device comprising a spray nozzle according to one aspect of the invention.

[FIG. 1] illustrates a face-on view of a motor vehicle 2 on which an optical sensor 4 is installed. The optical sensor 4 seeks to assist the driver of the vehicle 2 in certain driving situations, for example during a parking maneuver. The optical sensor 4 may be a camera, a laser sensor or any other sensor based on the emission and/or the detection of light in the spectrum visible or invisible to humans, in particular the infrared. The optical sensor 4 is positioned at the level of an opening 6 passing through the radiator grille 8 of the motor vehicle 2. The optical sensor 4 is thus exposed to dust and splashed organic matter. The external face 10 of the optical sensor 4 therefore needs to be cleaned regularly in order to guarantee optimal operation of the driver-assistance system.

In order to do this, the motor vehicle 2 comprises a cleaning device 12 arranged in the vicinity of the optical sensor 4. The cleaning device is configured to spray a cleaning fluid on demand, so as to remove dirt present on the external face 10 of the optical sensor 4. In the example illustrated in [FIG. 2], without this limiting the invention, the cleaning device 12 and the optical sensor 4 are mounted in housings formed in a common unit 14. The optical sensor 4 and the cleaning device 12 are mounted in the common unit 14 via an intermediate support element 16. The optical sensor 4 and the cleaning device 12 extend longitudinally along two axes of elongation, (X) and (X'), respectively, that are substantially mutually parallel. The axis of elongation (X) associated with the optical sensor corresponds to the optical axis of the optical sensor 4, and the axis of elongation (X') associated with the cleaning device 12 corresponds to the axis of deployment of a telescopic part of the cleaning device 12.

Figure 2:
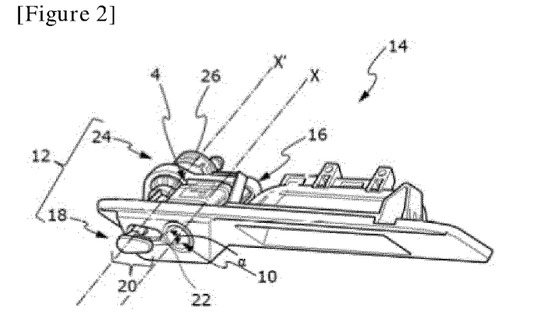
FIG. 2 is a perspective depiction of the optical detection system and of the cleaning device of FIG. 1, notably showing the axes of elongation of the optical detection system and of the cleaning device and a spray nozzle according to one aspect of the invention, positioned at the free end of the cleaning device.

In [FIG. 2], the cleaning device 12 is a telescopic device, depicted here in the deployed position so that a cleaning fluid can be sprayed, via a spray nozzle 20 present at the end of the cleaning device, onto the optical sensor 4.

The cleaning device 12 additionally particularly comprises a conveying body 24, in this instance comprising a hollow body inside which a piston 18 is able to move between a retracted position and the above-mentioned deployed position, this mobility contributing to the telescopic deployment of the spray nozzle 20. The hollow body has a shape exhibiting symmetry of revolution about the axis of elongation (X'), being closed at one end by an inlet flange 26 and having at the opposite end a sleeve inside which the piston is able to slide. An inlet endpiece for admitting a cleaning fluid is formed as a projection from the inlet flange 26.

As has been specified, the piston 18 of the cleaning device comprises at its end a spray nozzle 20, which is fluidically connected to the rest of the cleaning device by known means, so as to allow the spraying of a fluid passing through the cleaning device 12.

The spray nozzle 20 comprises two distinct parts, namely a base 30, secured to the piston 18, and a cover part 32. When assembled, these two parts between them define a distribution duct 34 which extends between a proximal end 36, forming the inlet of the distribution duct and fluidically connected to a distribution canal of the cleaning device, and a distal end 38 of the spray nozzle 20, forming the outlet of the duct via which the fluid is able to be sprayed toward the optical surface that is to be cleaned.

Figure 3:
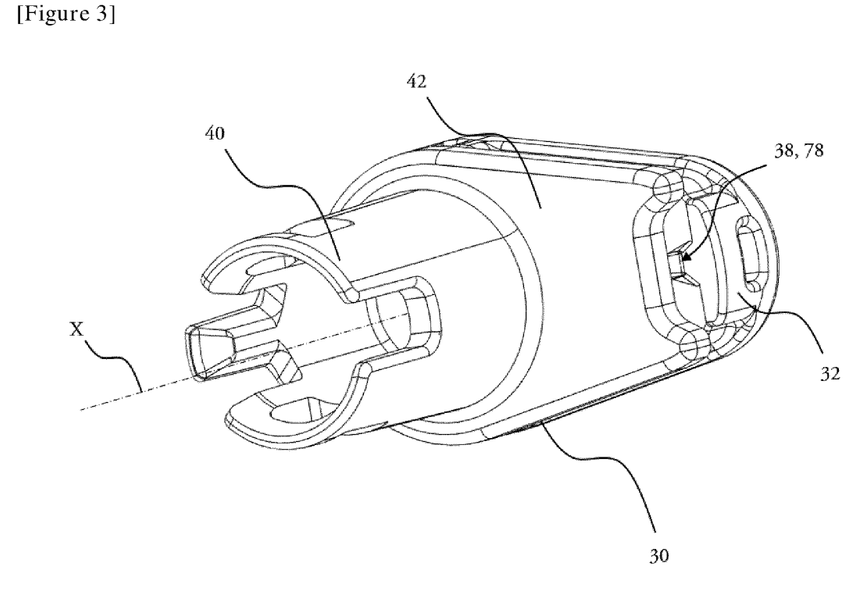
FIG. 3 and FIG. 4 are perspective views of a base of the spray nozzle according to one aspect of the invention.
Figure 4:
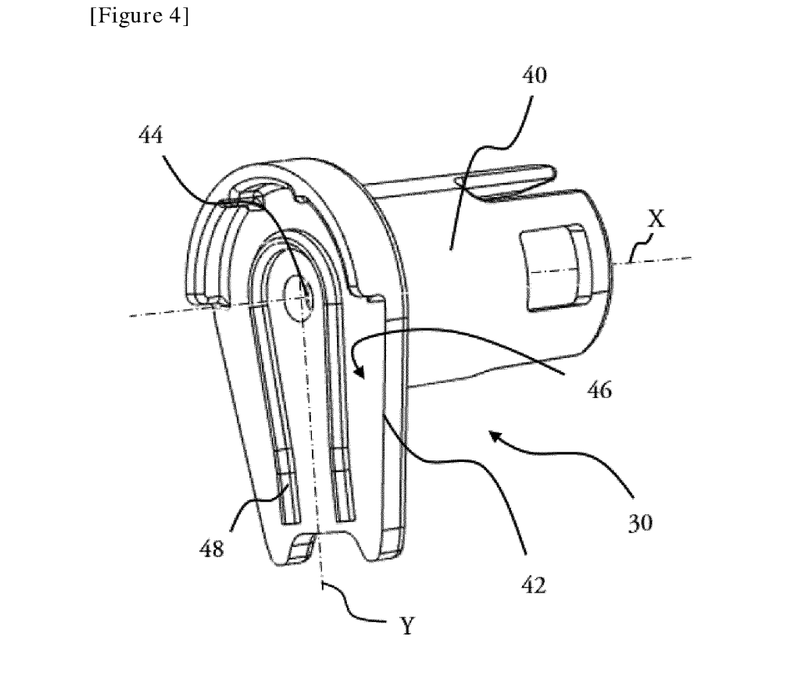

The base 30 of the spray nozzle, visible in FIGS. 3 and 4, comprises a fixing portion 40 for fixing to the piston 18, this fixing portion here being formed of a cylindrical barrel which extends along the axis of elongation (X). The fixing portion 40 is of a shape that complements the free end of the piston 18, so that these can be attached to one another by elastically clipping them together, for example. The attachment of the spray nozzle 20 to the rest of the cleaning device 12 is rendered fluidtight by the interposition of an O-ring, not depicted.

The base 30 of the spray nozzle also comprises a support portion 42 intended to be covered by the aforementioned cover part 32, the support portion extending along an axis (Y) which is normal or substantially normal to the axis of elongation (X) of the cylindrical barrel (visible in [FIG. 4]). An orifice 44 opens onto a contact face 46 of the base, facing away from the piston 18. It will be appreciated that this orifice communicates with the distribution canal of the cleaning device, being arranged in the continuation of the axis of elongation of the cleaning device, so that this orifice 44 allows the fluid present in the cleaning device deployment body to flow in the direction of the distribution duct formed in the distribution nozzle.

The contact face 46 is intended to be covered by the cover part 32. The contact face 46 has a planar or substantially planar surface, and it comprises a rib 48 partially surrounding the orifice 44. As mentioned below, the rib 48 is intended to allow fluidtight assembly between the base 30 and the cover part 32 of the spray nozzle 20 and to define the shape of the distribution duct. It should therefore be noted that the rib 48 has the shape of a U, with branches extending toward the distal end 38 of the spray nozzle.

Figure 5:
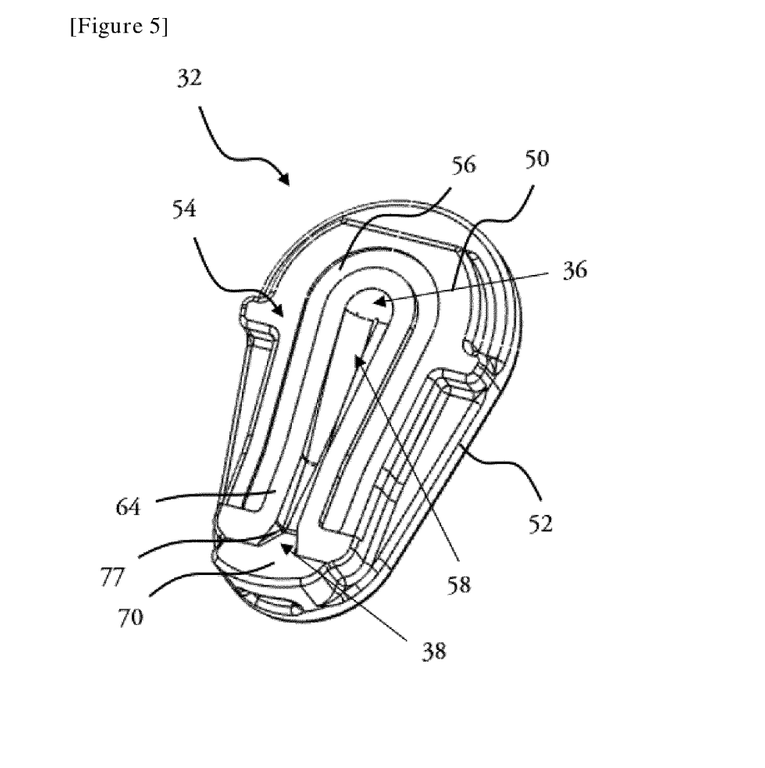
FIG. 5 is a perspective view, viewed from beneath, of the cover part that contributes to forming, with the nozzle of FIG. 4, the spray nozzle according to one aspect of the invention.
Figure 6:
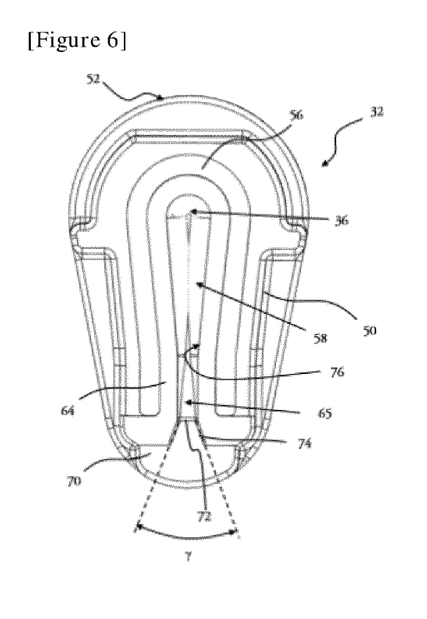
FIG. 6 is a view from above of the cover part, notably showing a ramp for forming a flat jet and the flaring of a distribution duct formed in the cover part at the level of the ramp.
Figure 7:
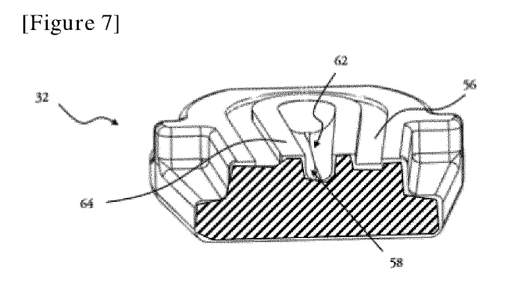
FIG. 7 is a view in section of the cover part of FIG. 6, from a perspective angle that shows the shapes created in the cover part in order notably to form the distribution duct.

As illustrated in [FIG. 5], [FIG. 6] and [FIG. 7], the cover part 32 of the spray nozzle comprises a sleeve 50, directly in contact with the base 30, and a closure plate 52 forming a flange radially extending the opposite end of the sleeve to the base 30.

The sleeve 50 has a free end face 54, intended to be brought into contact with the contact face 46 of the support portion 42 of the spray nozzle 20. The sleeve 50 comprises an impression 56, notably visible in [FIG. 5], [FIG. 6] and [FIG. 7], formed on the free end face 54, and configured to correspond in shape and dimensions to the rib 48 arranged on the base. It will be appreciated, as is partially visible in [FIG. 9], that the impression 56 and the spline 48 collaborate, when the spray nozzle is assembled by the fixing-together of the base 30 and of the cover part 32, to render fluidtight the circulation of fluid in the spray nozzle.

Provision may be made for the cover part 32 to be adhesively bonded to the base 30 of the spray nozzle, or else for these to be assembled using elastic-deformation means. In one particular embodiment, which notably ensures fluidtight fixing and therefore minimizes the risks of leaks of fluid supposed to circulate in the spray nozzle, the two parts are fusion bonded to one another, notably using an ultrasonic welding process or a laser welding process. Both for reasons concerned with simplifying assembly and esthetic reasons, the two parts of the spray nozzle 20 have, respectively, in section in a plane perpendicular to the axis of longitudinal elongation (X) of the cleaning device, peripheries of equivalent shape and dimensions.

The cover part 32 of the spray nozzle comprises, on its free end face, a trench 58 which extends inside the impression 56, in the direction of the distal end 38 of the spray nozzle, so as to face the opening of the orifice 44.

As illustrated in [FIG. 5], [FIG. 6] and [FIG. 7] in particular, the trench 58 contributes to forming, with the contact face 46 of the base 30, the aforementioned distribution duct 34 extending along the axis (Y).

A bottom wall 62 of the distribution duct 34, positioned on the opposite side from the base 30, is formed by the bottom of the trench 58, which extends parallel or substantially parallel to the plane in which the free end face 54 of the sleeve extends. The depth of the trench 58, defined by the position of the bottom wall, is of the order of 0.3 to 1.5 millimeters, it being appreciated that this value is given by way of indication without being limiting of the invention.

The distribution duct 34 is bounded by two lateral walls 64 which are normal or substantially normal to the bottom wall 62. In the example illustrated, the lateral walls have an internal face that is upright and perpendicular to the bottom wall at the level of the distal end of the distribution duct 34.

In this distribution duct 34, the lateral walls 64 are separated by a distance comprised between 3 and 10 millimeters, it being noted that, as will be described in greater detail later, the duct has a width, namely a distance between the lateral walls, which varies from one end to the other, flaring at the level of the fluid outlet and having a width at the level of the fluid inlet that is greater than the width at the level of the fluid outlet. The result of this is that there is a restriction throat 65 in a central part of the duct.

Figure 9:
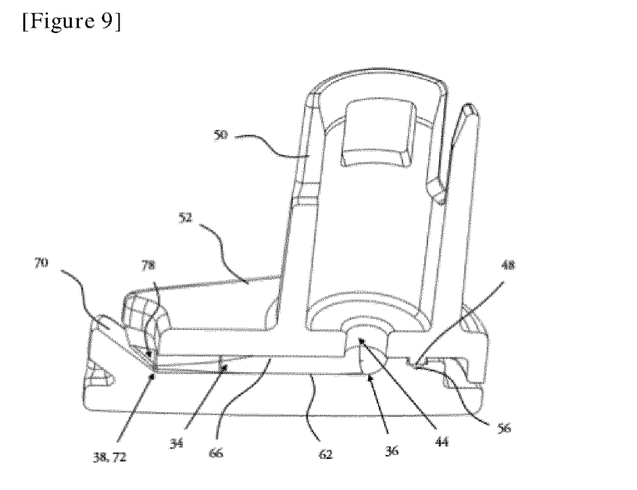
FIG. 9 is a longitudinal section through a spray nozzle according to the invention, comprising the cover part and the base which are illustrated in FIGS. 3 to 8.

As illustrated notably in FIG. 9, the circulation of fluid as far as the outlet orifice of the spray nozzle is rendered possible by the creation of a distribution duct 34 formed by pressing the free end face 54 of the cover part 32 closely against the contact face 46 of the base 30. The contact face 46 thus forms an upper wall 66 closing the distribution duct 34 so as to obtain a continuous path able to guide the fluid with the distribution canal of the cleaning device.

The cover part 32 of the spray nozzle also comprises an inclined plane forming a ramp 70, positioned facing the distal end of the distribution duct 34. According to the present example, the ramp 70 is formed by a protuberance projecting from the contact face 46 of the cover part 32. The inclined plane extends notably as a projection from the free end face 54 of the sleeve 50 and the ramp thus formed extends laterally in such a way as to lie both facing the distal end of the distribution duct 34 and facing the lateral walls 64 bordering this duct. The ramp 70 forms with the plane in which the bottom wall 62 of the distribution duct extends, an angle of inclination B, as is notably visible in [FIG. 8]. The value of the angle of inclination B is comprised between 10° and 60°, notably between 15° and 50°, and preferably of the order of 20 to 30°. In that way, a cleaning fluid coming from the distribution duct 34 is deflected by the ramp 70, in the form of a flat and divergent jet 100, to clean the external face 10 of the optical sensor 4, as is illustrated schematically in [FIG. 2]. The purpose of the ramp 70 is to break up the flow of fluid leaving the distribution duct 34 and scatter it in a plane perpendicular to the ramp-forming inclined plane. What is meant by a "flat jet" is a jet of fluid contained in a volume characterized by one dimension that is very small in comparison with the other two dimensions of said volume. In other words, the jet of fluid is comprised between two closely-spaced and mutually parallel planes.

Figure 8:
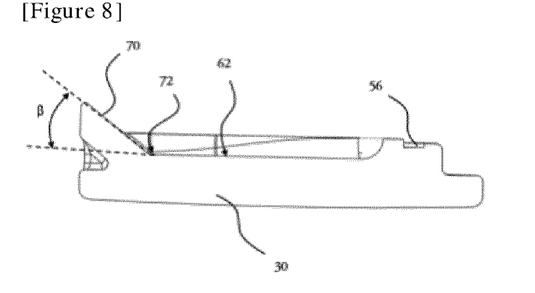
FIG. 8 is a longitudinal section through the cover part of the spray nozzle, notably showing the angle of inclination of the ramp.
Figure 10:
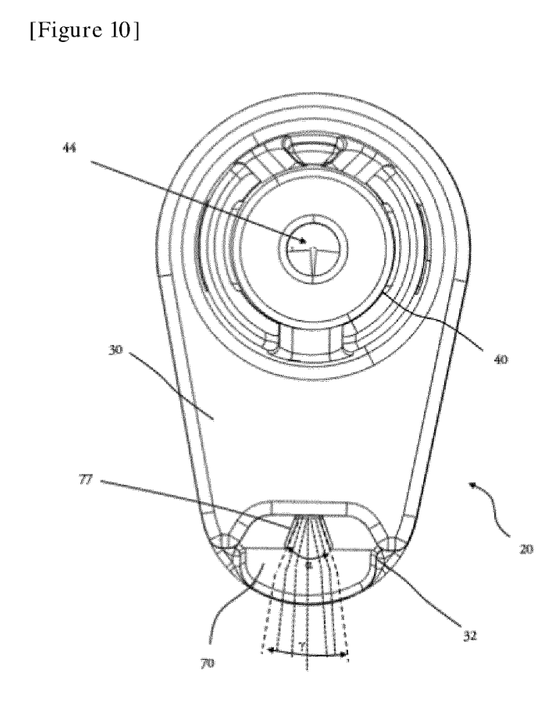
FIG. 10 is a view of the spray nozzle from beneath, showing the sprayed fluid exiting the spray nozzle.

In order to limit the value of the angle of divergence α (visible notably in [FIG. 2], and in [FIG. 10]) of the flat jet formed after the fluid has been reflected off the ramp 70, the cover part 32 is configured in such a way that the distribution duct 34 created in the spray nozzle 20 is extended as far as the inclined plane that forms the ramp 70 (see [FIG. 8]). In other words, the bottom wall 62 and the lateral walls 64, formed in the cover part and contributing to defining the distribution duct 34, extend as far as the inclined plane that forms the ramp 70 so as to exhibit continuity of material.

The inclined plane that forms the ramp 70 extends toward the inside of the sleeve as far as the bottom wall 62 contributing to forming the distribution duct 34, forming an arris of intersection 72 at the intersection between this bottom wall and the ramp.

Furthermore, each lateral wall extends in such a way that the free end face 54 of the sleeve 50 is extended until it comes into contact with the ramp 70, thus forming an arris of intersection 74. Thus, each lateral wall 64 is connected to the inclined plane that forms the ramp 70 along one of these arrises 74. Each lateral wall 64 has an internal face 76, arranged facing the internal face of the other lateral wall contributing to delimiting the distribution duct 34. In the vicinity of the distal end 38 of the duct, each lateral wall has a chamfered portion 77, forming a flaring between the internal faces 76. The chamfered portions here have a planar shape, forming between them an angle of opening γ of the distal end of the distribution duct. The value of the angle γ is comprised between 10° and 80°, preferably between 30° and 50°, or the order of 40°. In other words, at the level of the distal end 38 of the distribution duct 34, the lateral walls 64 diverge from one another in the direction of the inclined plane that forms the ramp 70.

It should be noted that the end of the upper wall 66 of the distribution duct 34 is at least partially set back from the inclined plane 70, so as to delimit an edge of a distribution orifice 78 via which the cleaning fluid is sprayed.

Connecting the lateral walls 64 to the ramp 70, and forming a flaring of the distal end 38 of the distribution duct 34, by making said lateral walls diverge from one another as they progressively near the ramp 70, advantageously allows the maximum value of the angle of divergence a of the flat jet 100 exiting the distribution orifice 78 to be limited.

The invention therefore makes it possible to prevent the flat jet from broadening when its pressure and/or temperature vary within the ranges of values defined hereinabove. Under these changing conditions, the fluid impinges on the ramp always with the same angle of opening γ because of the flaring of the lateral walls which extend as far as the ramp, without interruption of these lateral walls. This results in controlled divergence of the flow before it impinges on the ramp and therefore in controlled divergence on leaving the distribution nozzle.

In the example illustrated, and as depicted more particularly in FIG. 9, the variation in the angle of divergence a of the flow leaving the spray nozzle is ensured to be of the order of 5 to 10°, it being understood that, in a prior-art design without lateral walls that flare and continue as far as the ramp, these variations could range as high as 40°. As a result, a spray nozzle according to the invention allows the cleaning of the external face 10 of the optical sensor to remain substantially identical even when the pressure and/or the temperature of the fluid vary within predetermined ranges.

It should be noted that the invention is not restricted to the cleaning device spray nozzle embodiments explicitly described hereinabove alone, and that, by way of nonexhaustive example of a variant, the shape of the components that make up the spray nozzle and/or the shape of the trench contributing to forming the distribution duct could notably be modified, provided that the spray nozzle comprises an inclined plane connected to lateral walls of the distribution canal, said lateral walls diverging in the direction of the inclined plane.

The invention claimed is:

1. A fluid spray nozzle configured to be arranged on a body of a cleaning device for cleaning an optical detection system mounted on a motor vehicle, the fluid spray nozzle comprising:
   a base; and
   a cover part, wherein the cover part comprises an inclined plane that forms a ramp;
   wherein the base and the cover part form an internal distribution duct which extends between a proximal end of the fluid spray nozzle forming an inlet of the internal distribution duct fluidically connected to a fluid distribution canal formed in the body of the cleaning device, and
   a distal end of the fluid spray nozzle forming an outlet of the internal distribution duct;
   wherein the internal distribution duct is delimited at least by a bottom wall of the internal distribution duct and two opposing lateral walls of the internal distribution duct;
   wherein the two opposing lateral walls includes chamfered portions, wherein the chamfered portions are configured to produce a flat jet of fluid;
   wherein the chamfered portions of the two opposing lateral walls are in the vicinity of the distal end;
   wherein the ramp is arranged in a path of the fluid at a level of the outlet of the internal distribution duct and extends beyond the lateral walls; and
   wherein the two opposing lateral walls diverge from one another, in the inclined plane that forms the ramp, as the two opposing lateral walls progressively approach the ramp.

2. The fluid spray nozzle as claimed in claim 1, wherein an intersection between the bottom wall and the ramp comprises an arris at an exterior angle between 10° and 60°, and wherein an intersection between each one of the two opposing lateral walls and the ramp comprises a rectilinear or near-rectilinear arris.

3. The fluid spray nozzle as claimed in claim 2, wherein the two opposing lateral walls extend perpendicular to the bottom wall at least at the level of the distal end of the internal distribution duct in a portion in which the two opposing lateral walls diverge from one another.

4. The fluid spray nozzle as claimed in claim 1, wherein an intersection between each one of the two opposing lateral walls and the ramp forms a rectilinear or near-rectilinear arris of intersection, and wherein an angle between 10° and 80° is formed between arrises of intersection.

5. The fluid spray nozzle as claimed in claim 1, wherein the ramp forms with a plane in which the bottom wall of the internal distribution duct extends, an angle of inclination comprised between 10° and 60°.

6. The fluid spray nozzle as claimed in claim 1,
   wherein the base is fixed to the cover part; and
   wherein the internal distribution duct is formed between the base and the cover part.

7. The fluid spray nozzle as claimed in claim 6, wherein the cover part is configured to form, in one piece, the bottom wall, the two opposing lateral walls, and the inclined plane that forms the ramp.

8. A cleaning device for an optical detection system mounted on a motor vehicle, comprising the fluid spray nozzle as claimed in claim 1.

9. The cleaning device as claimed in claim 8, wherein the fluid spray nozzle is arranged at an end of a telescopic body of the cleaning device, wherein the telescopic body is part of the base and has a symmetry of revolution around the axis of elongation, and wherein the cleaning device-is configured to adopt at least a rest position and a work position in which the fluid spray nozzle faces a glazed surface of the optical detection system that is to be cleaned.

10. A motor vehicle comprising the cleaning device as claimed in claim 8.

* * * * *